United States Patent [19]

Lattin, Jr. et al.

[11] Patent Number: 5,241,630

[45] Date of Patent: Aug. 31, 1993

[54] DEVICE CONTROLLER WITH A SEPARATE COMMAND PATH BETWEEN A HOST AND THE DEVICE AND A SEPARATE DATA PATH INCLUDING A FIRST IN, FIRST OUT MEMORY BETWEEN THE HOST AND THE DEVICE

[75] Inventors: Thomas W. Lattin, Jr., Houston; Thomas W. Grieff; Ryan A. Callison, both of Spring, all of Tex.

[73] Assignee: Compaq Computer Corp., Houston, Tex.

[21] Appl. No.: 612,135

[22] Filed: Nov. 13, 1990

[51] Int. Cl.⁵ .................. G06F 13/00; G06F 15/16
[52] U.S. Cl. ........................ 395/325; 395/250; 364/228; 364/238.3; 364/239; 364/239.7; 364/260; 364/260.1; 364/DIG. 1
[58] Field of Search ... 364/200 MS File, 900 MS File, 364/131; 395/275, 250, 425, 325, 200, 400; 340/798, 825.06; 370/85.1

[56] References Cited

U.S. PATENT DOCUMENTS

| | | | |
|---|---|---|---|
| 4,103,328 | 7/1978 | Dalmasso | 364/200 |
| 4,138,732 | 2/1979 | Suzuki et al. | 364/900 |
| 4,417,304 | 11/1983 | Dinwiddie, Jr. | 364/200 |
| 4,591,973 | 5/1986 | Ferris et al. | 364/200 |
| 4,612,613 | 9/1989 | Gershenson et al. | 364/200 |
| 4,773,004 | 9/1988 | Gershenson et al. | 364/200 |
| 4,775,978 | 10/1988 | Hartness | 371/38 |
| 4,779,190 | 10/1988 | O'Dell et al. | 364/200 |
| 4,788,638 | 11/1988 | Ogawa et al. | 364/200 |
| 4,825,403 | 4/1989 | Gershenson et al. | 364/900 |
| 4,843,544 | 6/1989 | DuLac et al. | 364/200 |
| 4,860,244 | 8/1989 | Bruckert et al. | 364/900 |
| 4,918,589 | 4/1990 | Floro et al. | 364/132 |
| 4,918,597 | 4/1990 | Krishnan et al. | 364/200 |
| 5,056,010 | 10/1991 | Huang | 364/200 |
| 5,065,314 | 11/1991 | Maskovyak | 395/325 |
| 5,088,025 | 2/1992 | Fujimoto | 395/275 |

FOREIGN PATENT DOCUMENTS

0262468 6/1988 European Pat. Off. .
0391584 10/1990 European Pat. Off. .

OTHER PUBLICATIONS

National Cash Register Corporation, data sheet for 53C95 SCSI controller chip, pp. 1–64; 1990.
Klueber, Chuck, Intellistor, Inc., "Combining Raid 1, 3, and 5 Arrays with a Single Controller" Sep. 18, 1989.
Imprimis, data sheet for ArrayMaster 9058 Controller, 1989.

Primary Examiner—Michael R. Fleming
Assistant Examiner—Gopal C. Ray
Attorney, Agent, or Firm—Pravel, Hewitt, Kimball & Krieger

[57] ABSTRACT

A SCSI bus controller which has a separate data path from the SCSI bus to the host bus and a separate command path for use to communicate with a local microprocessor. The local microprocessor is connected to a dual port RAM, the other port of which is connected to a bus master controller linked to the host system. Commands and status are passed via the dual port RAM. Data is passed through a FIFO. The local microprocessor does not have access to the data path but only controls direction of the data flow, the initiation of the sequence and the completion of the sequence.

9 Claims, 8 Drawing Sheets

DEVICE CONTROLLER WITH A SEPARATE COMMAND PATH BETWEEN A HOST AND THE DEVICE AND A SEPARATE DATA PATH INCLUDING A FIRST IN, FIRST OUT MEMORY BETWEEN THE HOST AND THE DEVICE

BACKGROUND OF THE INVENTION

1. Field of the Invention

The present invention relates to peripheral device controllers used in computer systems, and more particularly to controllers having an onboard processor for local supervisory control and supervising a secondary bus.

2. Description of the Related Art

A common peripheral bus specification used for connecting disk drives, tape back-up units and other peripheral items to a computer system is the Small Computer System Interface or SCSI standard. The SCSI bus interface has been developing over a period of years and has entered a second generation referred to as SCSI-2. Up to seven different peripheral devices can be connected to a SCSI bus and be controlled through a single SCSI bus controller unit. In personal computers the SCSI bus controller is preferably in the form of a interchangeable circuit board or adapter which is installed in one of the slots in the personal computer. In this manner the microprocessor forming the basis of the personal computer system can interact with the SCSI bus controller and access the particular peripheral devices in a given installation.

One of the reasons for the growing interest in the SCSI bus is the relatively high data transfer rates which are available, particularly with the advent of higher performance peripheral devices. This interest is further enhanced by the development of intelligent bus mastering controller units which can be installed in the various newer computer buses, such as those according to the Extended Industry Standard Architecture (EISA) or the Micro Channel Architecture (MCA). The bus mastering chips allow very high data transfer rates between the memory in the personal computer and the local adaptor, and when combined with the high data rates possible in the SCSI bus, theoretically very high performance peripheral systems could be developed. However, one problem which develops relates to the transfer of data between the devices residing on the SCSI bus and the computer system bus. Because the two buses are operating asynchronously and at different data rates, it is required that some sort of buffering memory be utilized on the SCSI bus controller card. A further problem is that commands must also be transferred between the system and the SCSI bus and SCSI bus controller. If the main system processor is used to provide control of the various operations, then the performance of the bus controller is greatly diminished. If a local onboard processor is utilized, then performance can be improved, but the buffering problem still remains.

Conventionally, the local microprocessor is involved both in the transfer of the data from the SCSI bus and the transfer of data to the host bus, thus limiting data transfer operations to the effective speed of the local processor. Given the high data transfer rates possible on both the computer system bus and the SCSI bus, this inclusion of the local processor and its multiple operations generally results in reduction of the potential data rates. Therefore it is desirable that the local microprocessor be removed from the actual data transfer operations between the SCSI bus and the host computer bus, thus allowing higher data throughput.

One technique for resolving the problem has been the use of a caching controller, where large amounts of data are transferred into a cache memory on the controller and then transferred under control of the local microprocessor to the host system. The cache is sized so that a majority of the requests can be serviced from or by the cache, thus increasing computer system performance. But if a miss occurs, problems still exist. Additionally, large amounts of cache memory can be required, thus increasing expense.

SUMMARY OF THE INVENTION

A SCSI bus controller according to the present invention utilizes a data channel which, once operations have commenced, operates without any interaction with the local microprocessor and at the available data rate of both the SCSI controller unit and the bus mastering unit located in the controller, until a logical operation is almost completed. The local microprocessor issues a command to complete the transfer and the remaining data is transferred.

A first in, first out (FIFO) memory is utilized to perform the interface between the SCSI chip, which controls and coordinates the actual interface to the SCSI bus, and a bus master controller chip, which controls the actual interface to the personal computer system bus. The FIFO is used for all transfer of data information between the SCSI bus and the host bus and operates without interference from the local microprocessor once transactions are commenced and until transactions are essentially completed.

Commands are provided to the local processor via a separate channel on the bus master interface circuit to a dual ported random access memory (RAM), which is also connected to the local microprocessor. Thus in this manner all command information, be it operations requests or status returns, are performed without impact or interference with the data transfer which is occurring in a separate path. This allows optimization of the data path between the two units and the use of the FIFO.

The local microprocessor only performs actual command interpretation, status response and scheduling of operations between the SCSI bus and the host bus, and does not participate in the actual data transfer once it is commenced except for a minor completion of a data transfer at the end of a command, and even then without actually interpreting or receiving any of the data being transferred.

By removing the local microprocessor from the actual data flow and utilizing it only in a supervisory manner, data throughput is increased to values closer to that of the theoretical capabilities of the various buses.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
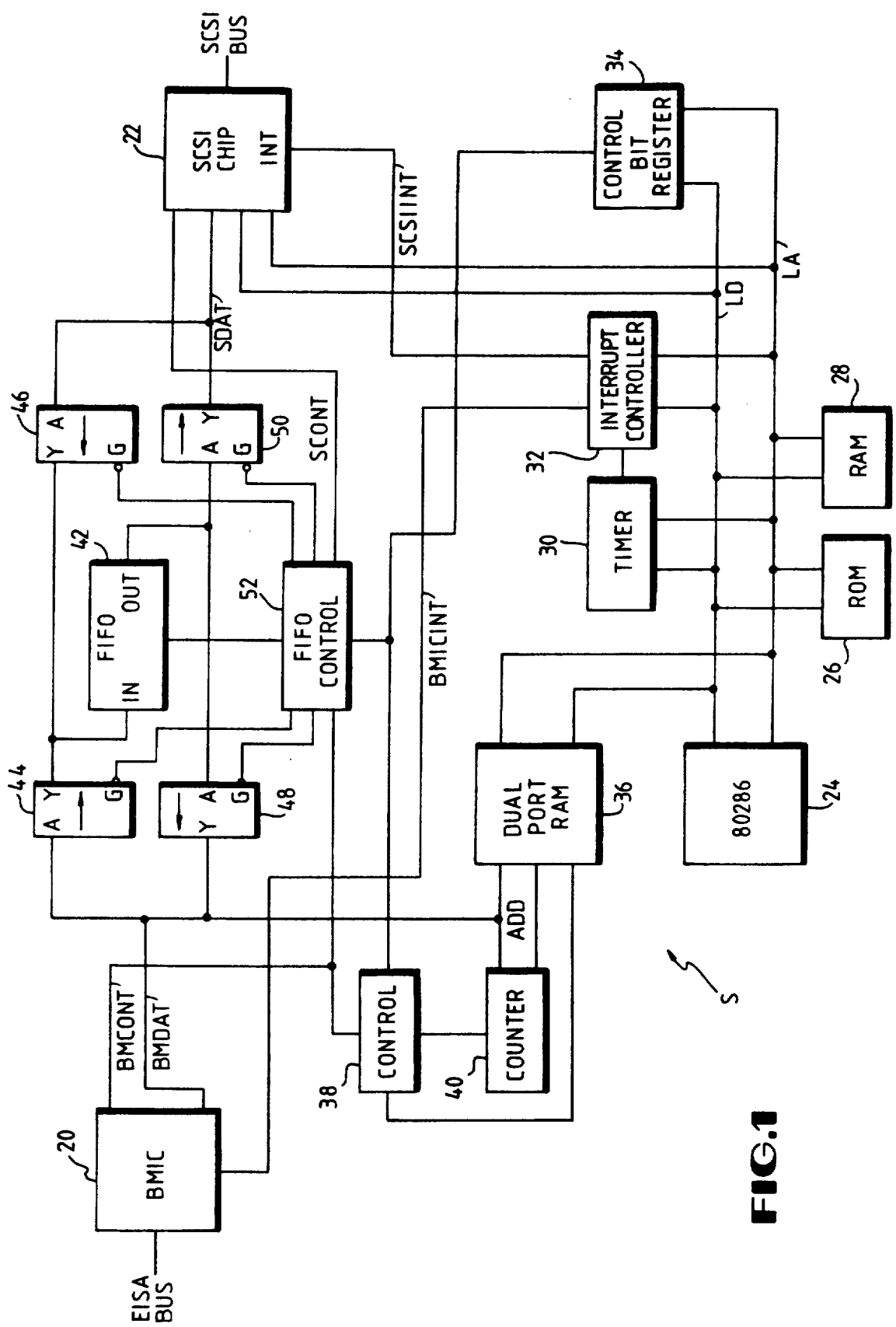
FIG. 1 is block diagram of a SCSI bus controller according to the present invention.
Figure 3:
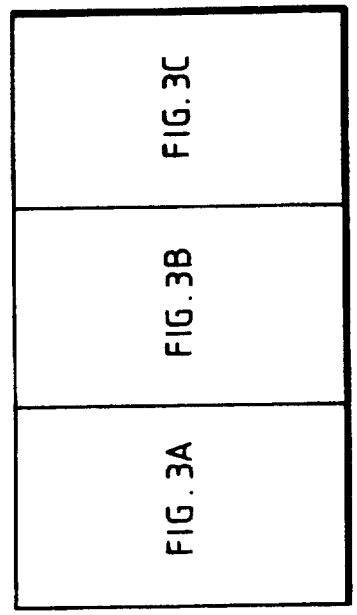
FIGS. 2 and 3 indicate the relationships of FIGS. 2A, 2B and 2C and FIGS. 3A, 3B and 3C, respectively.

Referring now to FIG. 1, the letter S generally refers to a SCSI bus controller according to the present invention. A bus mastering integrated circuit (BMIC) 20, preferably the 82355 produced by Intel Corporation for use with the EISA bus, is used to communicate between the host bus, the EISA bus in the preferred embodiment, in the personal computer in which the SCSI bus controller S is located and the various components located on the SCSI bus controller S. A SCSI controller chip 22, preferably the 53C95 from the National Cash Register Corporation, is coupled to the SCSI bus to perform control of operations on the SCSI bus, thus allowing increased speed of operations. Preferably the BMIC 20 contains two local transfer channels, thus allowing separation of commands and data. Preferably the SCSI chip 22 includes a separate data port and a separate command or control port, both ports having data and control portions. Reference to the data sheets for the preferred BMIC 20 and SCSI chip 22 is desirable and an understanding of the operations and interfaces of these devices is generally assumed in this description. In addition, understanding of the operation of the SCSI bus is generally assumed, with reference being made to the SCSI-2 specification available from Global Engineering Documents in Irvine, Cal.

The SCSI chip 22 is connected to the data, address and control lines of a local microprocessor 24, preferably an 80286 operating at 25 MHz from Harris Semiconductor.

By means of this interface between the SCSI chip 22 and the local microprocessor 24, command information can be transferred between the local microprocessor 24 to the SCSI chip 22. Also connected to the local microprocessor 24 is read only memory (ROM) 26 and random access memory (RAM) 28, which is used to hold the operating sequences of the local microprocessor 24 and for its temporary data storage. Preferably the local microprocessor 24 operates under a real time, multitasking operating system. A timer 30 is connected to the local microprocessor 24 to receive timer information for use in the various sequences performed by the local microprocessor 24 and to an interrupt controller 32 to provide interrupt information. The interrupt controller 32 is also coupled to the local microprocessor 24. The interrupt controller 32 further receives interrupt information from the SCSI chip 22 and the BMIC 20 to allow interrupt driven operation of the local microprocessor 24 by the two controller chips 20 and 22. Additionally, a control bit register 34 is connected to the local microprocessor 24. This control bit register 34 is used to provide certain single bits which are used to control various operations of the SCSI bus controller S.

A dual ported RAM 36 has one port connected to the local microprocessor 24 and has its second port coupled to the BMIC 20 by means of control logic 38 and a counter 40. The dual port RAM 36 is used for holding command and status information passed between the host system via the BMIC 20 and the local microprocessor 24. The dual port RAM 36 of the preferred embodiment includes chip and output enable, upper and lower byte and read/write inputs for each port. The BMIC 20 provides starting address information to the counter 40 and thereafter the counter 40 increments to provide addressing information to the second port of the dual port RAM 36. The data bus of the BMIC 20 is referred to as the BMDAT bus and is connected to the counter 40 and to the dual port RAM 36 while the control outputs of the BMIC 20 form the BMCONT bus and are provided to the dual port control logic 38.

A first in, first out (FIFO) memory 42 is used in the data channel between the SCSI chip 22 and the BMIC 20. Preferably the FIFO 42 is a synchronous, unidirectional FIFO having a 1 k by 18 bit size, preferably the IDT72225 from Integrated Device Technology, Inc. The FIFO 42 preferably contains write enable and write clock inputs to control the writing of information to the FIFO 42 and read enable and read clock inputs to control removal of information from the FIFO 42. Additionally, the FIFO 42 preferably includes a series of flag outputs to indicate the amount of data present in the FIFO 42. Preferably the flags include an empty flag, a full flag, a half-full flag and two programmable flags which indicate almost full and almost empty. Preferably the almost empty flag is set at ⅛ capacity of the FIFO 42 or 128 bytes, while the almost full flag is set at ⅞ or 896 bytes. The inputs of the FIFO 42 are connected to the outputs of a buffer 44 whose inputs are connected to the BMDAT bus from the BMIC 20 and to the outputs of a buffer 46 whose inputs are connected to the SDAT or data bus from the SCSI chip 22. The data outputs from the FIFO 42 are preferably connected to the inputs of a buffer 48 whose outputs are connected to the BMDAT bus and to the inputs of a buffer 50 whose outputs are connected to the SDAT bus.

The various gate or enabling inputs of the buffers 44, 46, 48 and 50 are provided as outputs of a FIFO control block 52. Additionally, the FIFO control block is connected to the FIFO 42 to receive the flag information from the FIFO 42 and to provide the read and write enable and clocking signals to the FIFO 42. Additionally the control bit register 34 is connected to the FIFO control 52 to provide certain control information from the local microprocessor 286. The BMCONT or control bus from the BMIC 20 is connected to FIFO control 52 to allow control of the direction and timing of data transfers with the BMIC 20. Further, the SCONT or SCSI chip control bus is provided from a SCSI chip 22 to the FIFO control logic 52 to allow transfer of data between the SCSI chip 22 and the FIFO 42.

It can be seen that the local microprocessor data bus, referred to as LD, is not provided to the actual data path between the SCSI chip 22 and the BMIC 20, but is connected only to the dual port RAM 36 and directly to the SCSI chip 22 command or control port. Thus, the local microprocessor 24 cannot perform the actual data transfer between the BMIC 20 and the SCSI chip 22.

The local microprocessor 24 only performs command and control functions and does not perform actual data transfer operations between the SCSI bus and the host bus. The host system develops a commmand block in its memory, provides the host memory starting address to the BMIC 20 and causes the BMIC 20 to interrupt the local microprocessor 24. The local microprocessor 24 programs the BMIC 20 to transfer the command block from the system memory to the dual port RAM 36. The local microprocessor 24 is interrupted by the BMIC 20 when the command block has been placed in the dual port RAM 36. The local microprocessor 24 retrieves the command information and operates on it as appropriate. If it is an information request, and the SCSI chip 22 is not otherwise busy, the local microprocessor 24 sets up the FIFO 42 for the transfer and provides the proper commands to the SCSI chip 22 and the BMIC 20, which perform the commands. The SCSI chip 22, the BMIC 20 and the FIFO control logic 52 interact to transfer the data between the buses. If the transfer is from the BMIC 20 to the SCSI chip 22, the BMIC 20 completes its portion of the transfer first and indicates this completion to the local microprocessor 24. If the transfer is from the SCSI chip 22 to the BMIC 20, the SCSI chip 22 will complete its transfer first and so inform the local microprocessor 24. These task completions are indicated by interrupts. Upon receiving the interrupt the local microprocessor 24 responds. The response generally includes flushing the FIFO 42 to complete the data transfer. When both the BMIC 20 and the SCSI chip 22 have completed their transfers, the local microprocessor 24 then places status or completion information in the dual port RAM 36 and causes the BMIC 20 to transfer the information to the host system memory and to interrupt the host system after the transfer is complete, signalling task completion. The actual set up and flushing of the FIFO 42 and data transfer is described in more detail below.

Figure 2:
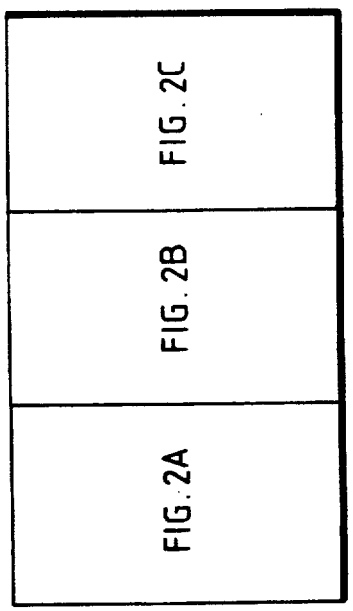
Figure 2A:
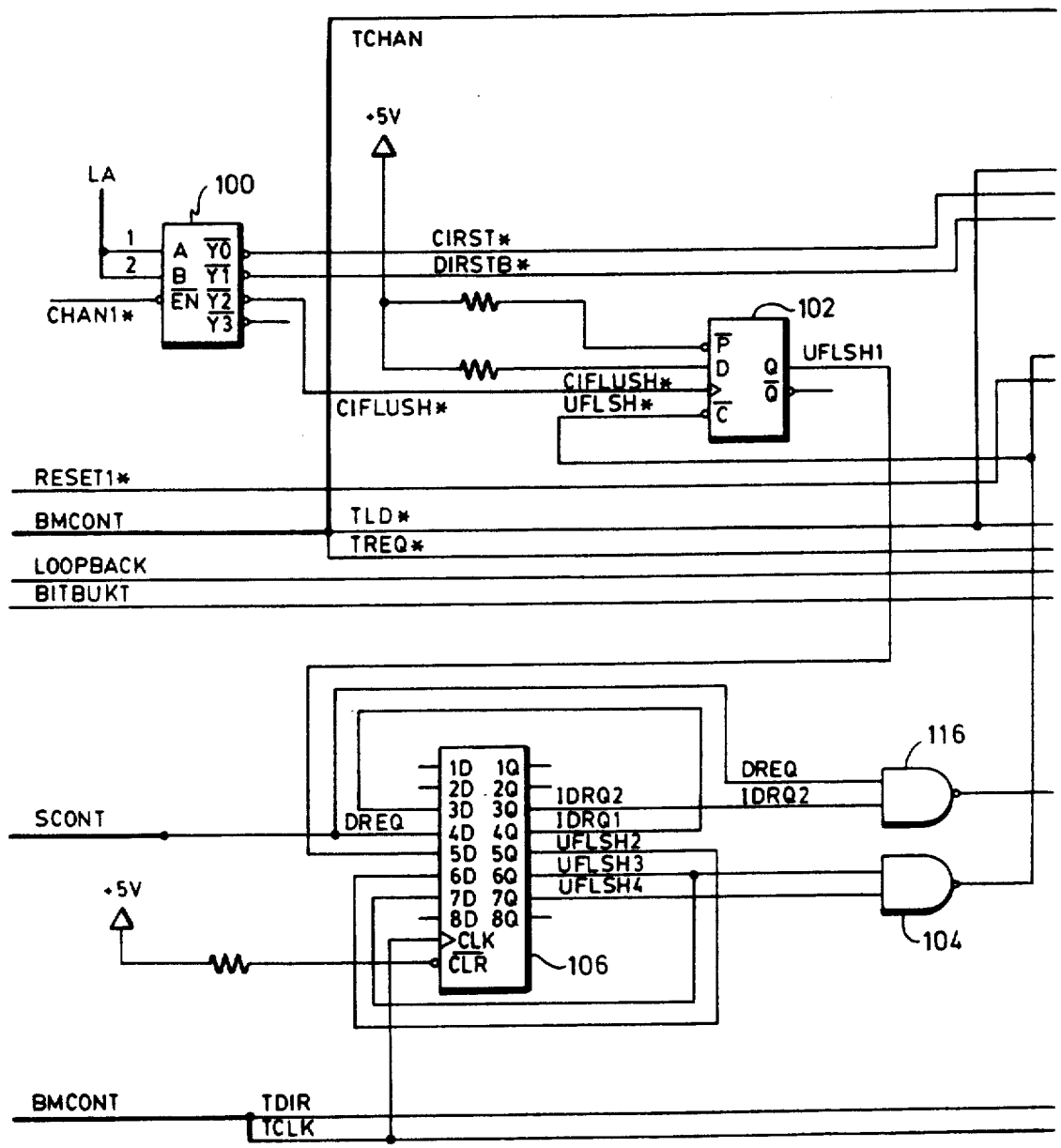
FIGS. 2A, 2B and 2C are schematic diagrams of portions of the control logic for use with the FIFO of FIG. 1.
Figure 2B:
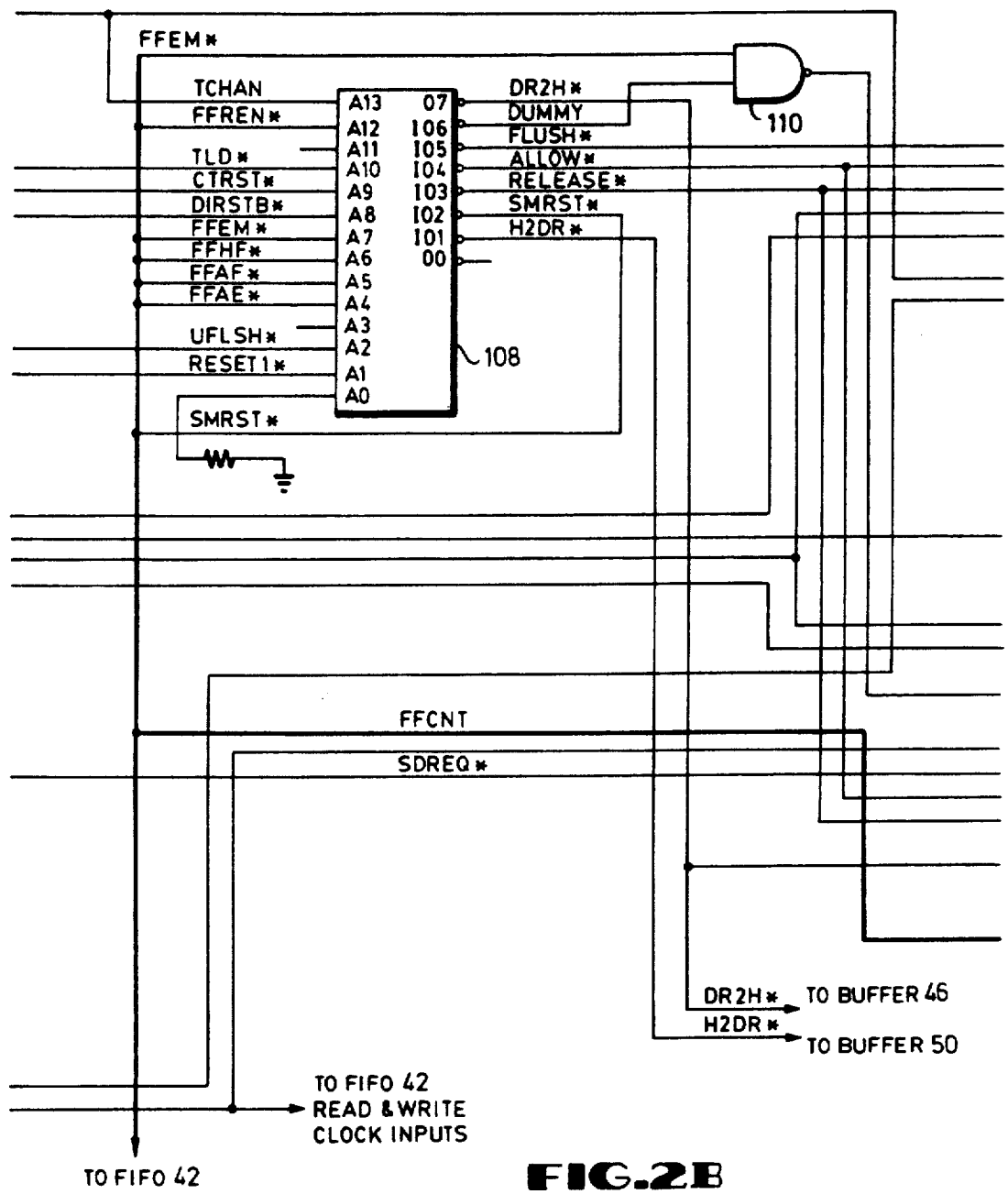
Figure 2C:
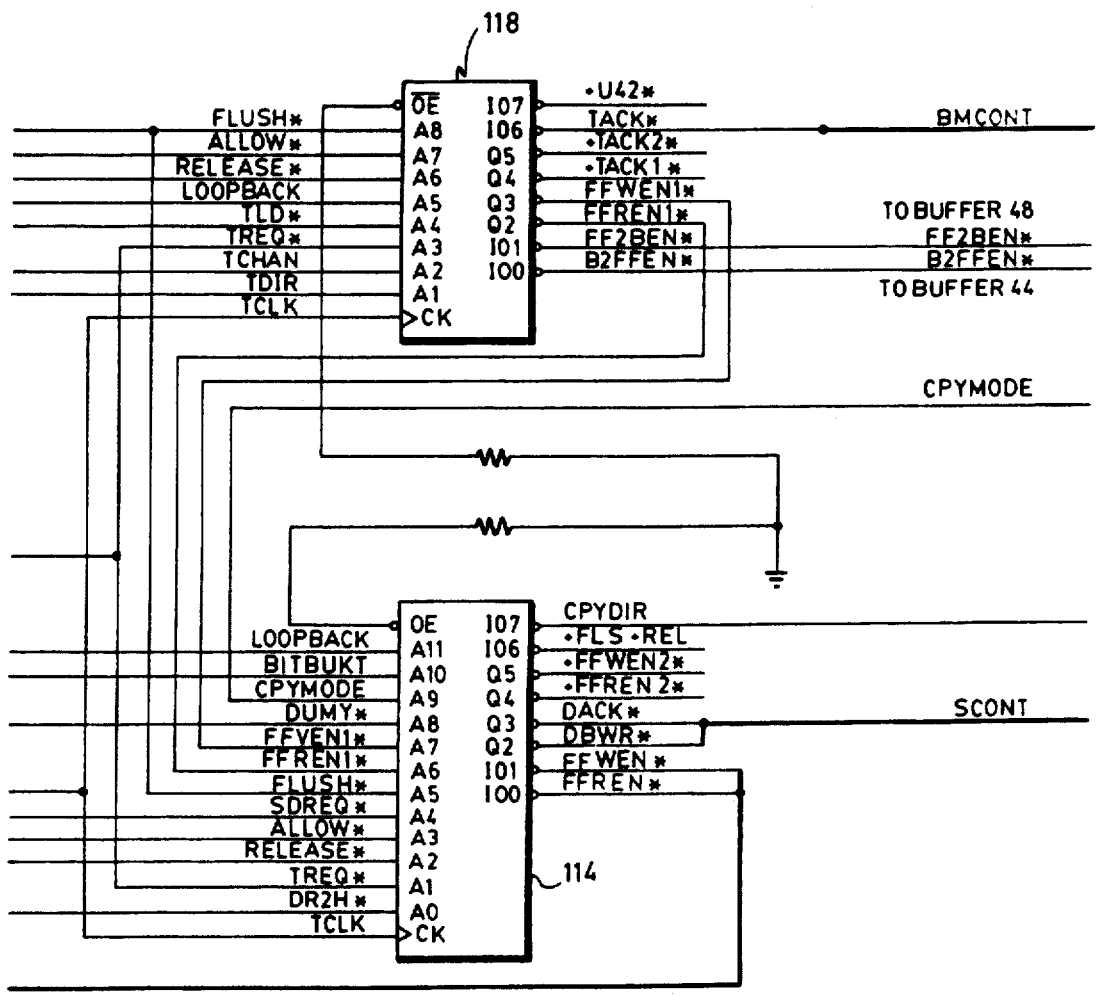

Referring now to FIGS. 2A, 2B and 2C, the interface of the FIFO control logic 52 with SCSI chip 22 is according to a DMA protocol which includes a DMA request line, a DMA acknowledge line and a direction of transfer or write/read signal. These signals are referred to as the DREQ, DACK* and DBWR* signals and are contained in the SCONT bus. In general when referring to signals in this description, an asterisk (*) after a signal mnemonic indicates that it is logically true when a low voltage level is present and is the inverse of the same signal mnemonic without the asterisk. Angle bracket included numbers after a signal mnemonic are used to indicate single or multiple bit positions in a wider logical signal, such as the data or address fields.

The interface between the BMIC 20 and the FIFO control 52 preferably is according to that of channel 1 of a 82355 from Intel Corporation, as indicated in the specifications for that particular device as published in the 1990 Peripherals volume by Intel Corporation, at pages 1-324 to 1-392. To this end several signals are utilized from or provided to the BMIC 20 and they are referred to as the TDIR or transfer direction signal; the TCLK signal which provides the clock or sequencing information; the TCHAN signal, which indicates if channel 1 or channel 0 of the BMIC 20 is being utilized; the TREQ* signal, which in combination with the TACK* signal, form the handshake signals for the request of information transfer; and the TLD* signal, which is the local address output load signal.

Several signals are received from the control bit register 34 by the FIFO control logic 52 and these are the LOOPBACK signal, the BITBUKT signal, the CPYMODE signal and the CPYDI signal. The LOOPBACK signal is used to set whether a loopback operation with the BMIC 20 is being utilized so that partial checking of operations can be performed by the BMIC 20. The BITBUKT signal is used to ignore information from the SCSI chip 22 for certain operations. The CPYDIR signal is used in combination with the CPYMODE signal for loopback operation of the SCSI chip 22 to indicate whether data is being provided to or from the FIFO 42. When the CPYMODE signal is set, SCSI loopback is being performed. The CPYDIR signal controls filling or emptying of the FIFO 42.

A signal referred to as RESET1* is received from the host computer system over the host bus and indicates, when active low, that a system reset is being performed. A 4 bit decoder 100 (FIG. 2A) has its A and B selection inputs connected to the LA or address bus of the local microprocessor 24 and its active low enable input connected to the CHAN1* signal. The CHAN1* signal is produced by address decode logic (not shown) so that when the local microprocessor 24 addresses a particular address space, a low strobe is provided to the enable input of the decoder 100. The 0 position inverted output of the decoder 100 provides the C1RST* signal or CHANNEL 1 RESET* signal which is used to cause a reset of the FIFO control logic 52. The 1 inverted output of the decoder 100 is the DIRSTB* signal or DIRECTION STROBE signal which is used to control the direction of data transfer between the host and SCSI buses. The bit 2 output of the decoder 100 is the C1FLUSH* signal, which indicates a request to flush the FIFO 42. This flushing is utilized to empty the FIFO 42 at the end of an operation of transferring data. During normal operations the FIFO 42 is preferably kept partially full of data to prevent certain register reloads from occurring, thus simplifying logic operation. However, at the end of a command, it is required that the conventional control logic be overridden to allow the FIFO 42 to be completely emptied and therefore the flush input is provided.

The C1FLUSH* signal is provided to the clocking input of a D-type flip-flop 102. The inverted preset and D inputs of the flip-flop 102 are connected to a high logic level, while the inverted clear input is connected to the output of a two input NAND gate 104. The non-inverted output of the flip-flop 102 is provided to a first D input of a multibit D-type flip-flop 106. The clocking signal for the flip-flop 106 is the TCLK signal provided to the BMIC 20. The first non-inverted or Q output of the flip-flop 106 is provided to a second D input of the flip-flop 106. The second non-inverted output of the flip-flop 106 is provided as one input to the NAND gate 104 and is provided to a third D input of the flip-flop 106. The third non-inverted or Q output of the flip-flop 106 is provided to the second input of the NAND gate 104. Thus in this manner the FLUSH signal is synchronized by the TCLK signal and is provided for a given duration.

The output of the NAND gate 104 is also provided as one input referred to as UFLSH* of a programmable array logic (PAL) device 108 referred to as the FIFO control PAL. The FIFO control PAL 108 is one of a series of PAL's used in the FIFO control 52 to control operations. Other inputs to the FIFO control PAL 108 are the TCHAN signal; the FFREN* signal, which is the FIFO read enable signal; the TLD* signal; the C1RST* signal; the DIRSTB* signal; the FFEM* or FIFO empty signal; the FFHF* signal or the FIFO half full signal; the FFAF* signal, which is the FIFO almost full signal; the FFAE* signal, which is the FIFO almost empty signal; and the RESET1* signal.

The various outputs of the FIFO control PAL 10B are the DR2H* signal, which is provided to the output enable input of the buffer 46; a DUMMY signal, which is provided to one input of a 2 input NAND gate 110; the FLUSH* signal, which when active low indicates that flushing is occurring or has occurred; the ALLOW* signal, which when active low indicates that data is allowed to enter the FIFO 42; the RELEASE* signal, which when low indicates that data can be removed from the FIFO 42; the SMRST* signal, which is used to reset the FIFO 42 and the FIFO control logic 52; and the H2DR* signal, which is provided to the output enable input of the buffer 50.

The various equations used in the PAL 108 to develop its operations are as follows:

```
SMRST    = C1RST + RESET1
H2DR     = DIRSTB · SMRST* + H2DR · SMRST*
DR2H     = H2DR*
RELEASE  = FFHF · SMRST* + RELEASE · FFAE* ·
           SMRST*
ALLOW    = SMRST + FFHF* · FFEM* + ALLOW ·
           FFAF*
FLUSH    = UFLSH · SMRST* + FLUSH · SMRST*
DUMMY    = DUMMY · SMRST* + FFREN
```

Thus the SMRST signal is high and the SMRST* signal is low when reset occurs or the FIFO 42 is to be cleared. The H2DR signal is active when the system is not being reset and the DIRSTB signal has been received. The DR2H signal is simply the inverse of the H2DR signal so that only one set of buffers is activated at a time. The RELEASE* signal is set when the FIFO 42 is half full and is cleared when the FIFO is almost empty. The ALLOW* signal is active low on reset and when the FIFO is between empty and half full and is cleared when the FIFO is almost filled. The FLUSH signal is produced when the UFLSH signal has been received from the decoder 100. Flushing is ceased upon reset of the FIFO 42. The DUMMY signal is made active when reads to the FIFO are enabled and is cleared on reset.

The FFEM* or FIFO EMPTY signal is provided as the second input to the NAND gate 110. The output of the NAND gate 110 is referred to as the DUMY* signal provided as one input to a SCSI chip control PAL 114. Other inputs of the SCSI control PAL 114 are the LOOPBACK signal; the BITBUKT signal; the CPYMODE signal; the FFWEN1* signal which indicates that the BMIC 20 wishes to write information; the FFREN1* signal, which is an indication that the BMIC 20 wishes to read data from the FIFO 42; the FLUSH* signal; the SDREQ* signal, which is a synchronized version of the data request signal from the SCSI chip 22; the ALLOW* signal, the RELEASE* signal, the TREQ signal, which is an indication that a request is being received from the BMIC 20; and the DR2H* signal. The TCLK signal is provided as the clock to several flip-flops located in the SCSI chip control PAL 114 to provide registered operation.

The SDREQ* signal is provided by the output of a two input NAND gate 116. One input to the NAND gate 116 is the DREQ signal provided from the SCSI chip 22 over the SCONT bus. The DREQ signal is also provided to a fourth D input of the flip-flop 106. The respective fourth output of the flip-flop 106 is provided to a fifth D input of the flip-flop 106. The fifth output of the flip-flop 106 is provided to the second input of the NAND gate 116, so that a data request from the SCSI chip 22 is synchronized and delayed, while a removal request happens immediately.

Preferably the SCSI control PAL 114 contains 4 D-type flip-flops. Two of the flip-flops produce signals referred to as FFWEN2 and FFREN2, which are used in developing the read and write enable signals provided to the FIFO 42. The preferred FIFO 42 operates such that when the particular enable signal is low, the data is clocked on the rising edge of the clock signal, in the preferred embodiment the TCLK signal, provided to that particular input set. The other two outputs of the flip-flops in the SCSI control PAL 114 are the DACK* and DBWR* signals, which are provided to the SCSI chip 22 to indicate acknowledgement of the data transfer request and whether the transfer request will be a read or a write. The two remaining outputs of the PAL 114 are the FFWEN* and the FFREN* signals which are provided, respectively, to the write and read enable inputs of the FIFO 42. The equations for the SCSI PAL 114 are as follows:

```
FFWEN2  :=  DACK · FFWEN2* · CPYDIR* · ALLOW
          + DACK · FFWEN2* · CPYDIR* · CYMODE
FFREN2  :=  SDREQ · DACK* · FLSREL · CPYDIR ·
            FFREN2*
          + FFREN* · DUMY · CPYDIR* · CPYMODE*
          + FFREN* · DUMY · LOOPBACK
          + SDREQ · DACK* · CPYMODE · CPYDIR ·
            FFREN2*

DACK    :=  SDREQ · DACK* · ALLOW · CPYDIR*
          + DACK · FFWEN2* · ALLOW · CPYDIR*
          + SDREQ · DACK* · FLSREL · CPYDIR
          + DACK · FFREN · FLSREL · CPYDIR
          + SDREQ · DACK* · CPYMODE
          + DACK · FFWEN2* · CPYMODE · CPYDIR*
          + DACK · FFREN · CPYMODE · CPYDIR

DBWR    :=  SDREQ · FLSREL · CPYDIR + DACK ·
            CPYDIR
          + SDREQ · CPYMODE · CPYDIR

FFWEN   =   FFWEN1 · TREQ + FFWEN2 · BITBUKT*
FFREN   =   FFREN1 · TREQ + FFREN2
FLSREL  =   FLUSH + RELEASE
```

Thus the FFWEN2 signal toggles when the SCSI chip 22 has an acknowledged request, the direction indicates a write to the FIFO 42 and the FIFO 42 can receive data or loopback operations are occurring. The FFREN2 signal toggles on data being requested by the SCSI chip 22, reads of the FIFO 42, and flushing, released or in loopback mode. The DACK signal is set to toggle once per word transfer with the SCSI chip 22. The DBWR signal is high during reads. The FFWEN signal tracks the FFWEN1 signal for BMIC 20 transfers and the FFWEN2 signal when the SCSI data is not being ignored. The FFREN signal tracks the FFREN1 signal for BMIC 20 transfers and the FFREN2 signal for SCSI chip 22 transfers.

A BMIC control PAL 118 is also contained in the FIFO control logic 52. The BMIC control PAL 118 preferably contains 4 D-type flip-flops and receives the TCLK signal as the clocking input to those flip-flops. The FLUSH*, ALLOW*, RELEASE*, LOOPBACK, TLD*, TREQ*, TCHAN, and TDIR signals are provided as inputs to the PAL 118. Two registered outputs from the BMIC control PAL 118 are the FFWEN1* and FFREN1* signals, which indicate that the BMIC 20 is desiring to do read or write operations respectively. The remaining two flip-flop outputs are the TACK1 and TACK2 signals which are used to provide internal operation of the PAL 118. The TACK* signal is provided by the PAL 118 to the BMIC 20 to indicate an acknowledgement of a data transfer request. The tri-state control of the TACK* signal is provided by the TACK2 signal. The FF2BEN* signal is provided to the output enable input of the buffer 48 and the B2FFEN* signal is provided to the output control of the buffer 44. The equations for the BMIC control PAL 118 are as follows:

```
FFREN1  := TREQ · RELEASE · TDIR* · TCHAN ·
              LOOPBACK*
           + TREQ · FLUSH · TDIR* · TCHAN ·
              LOOPBACK*
           + TREQ · RELEASE · TDIR* · TCHAN ·
              LOOPBACK
           + TREQ · FLUSH · TDIR* · TCHAN ·
              LOOPBACK

FFWEN1  := TREQ · ALLOW · TDIR · TCHAN
TACK1   := TREQ · RELEASE · TDIR* · TCHAN ·
              LOOPBACK*
           + TREQ · FLUSH · TCHAN · LOOPBACK*
           + TREQ · ALLOW · TDIR · TCHAN
           + TREQ · RELEASE · TDIR* · TCHAN* ·
           + LOOPBACK
           + TREQ · FLESH · TDIR* · TCHAN* ·
              LOOPBACK
           + TLD · TCHAN · TACK*
           + TLD · TCHAN* · TACK* · LOOPBACK

TACK2    := LOOPBACK + TCHAN
B2FFEN   =  TCHAN · TDIR · LOOPBACK* · TREQ
           + TDIR · LOOPBACK · TREQ
FF2BEN   =  TCHAN · TDIR* · LOOPBACK* · TREQ
           + TDIR* · LOOPBACK · TREQ
TACK     =  TACK1 · TREQ
           + TACK1 · TLD
TACK 3-S =  TACK2
```

Thus the FFREN1 signal is active when the BMIC 20 is requesting a transfer, the FIFO 42 is being read and is released or flushed and the data path channel is active for normal data transfers or the command path channel of the BMIC 20 is active for loopback operations. The FFWEN1 signal is active when the BMIC 20 is requesting a write transfer, the FIFO 42 can receive data and the data path channel is active. The transfer request is acknowledged by the TACK signal when proper and the buffers 44 and 48 are activated in the proper directions during the transfers.

Operation of the data channel is generally as follows. The local microprocessor 24 receives a transfer command from the host processor via the BMIC 20 and the dual port RAM 36. The local microprocessor 24 resets the FIFO 42 and the FIFO control logic 52, sets the direction if necessary and sets up the SCSI chip 22. The first described operation is a transfer from the BMIC 20 to the SCSI chip 22. When the local processor 24 notifies the BMIC 20 to initiate the transfer, the BMIC 20 begins providing data at a high rate to the FIFO 42 after the BMIC 20 gains access to the host bus. The SCSI chip 22 begins receiving the data at its rate. If the BMIC 20 is exceeding the reading rate of the SCSI chip 22, as generally occurs because the BMIC 20 is bursting data, the BMIC 20 halts operations when the FIFO 42 becomes almost full. Preferably the almost full point allows several sectors of data to be transferred in a burst, improving host bus efficiency. The BMIC 20 restarts transmitting data when the FIFO 42 goes below half full. This process continues until the BMIC 20 has transferred all desired data. Meanwhile, the SCSI chip 22 has been steadily removing data. When the BMIC 20 completed operations, the local microprocessor 24 was interrupted to set the FLUSH bit to allow the FIFO 42 to be emptied. The SCSI chip 22 proceeds to read the FIFO 42 until its internal counters reach zero. The continued reading would be stopped if the flush bit had not been set until the flush bit was set, because releasing stops at the almost empty point. When complete, the SCSI chip 22 interrupts the local microprocessor 24 to inform it that flush can be released and the FIFO is available for another transfer. The local microprocessor 24 informs the host system via the BMIC 20 that the transfer is complete.

Another command is received by the local microprocessor 24. This is a read command to transfer data to the host system. Again the local microprocessor 24 resets the FIFO 42 and the FIFO control logic 52 and sets the direction. Additionally, the SCSI chip 22 and the BMIC 20 are programmed for the transfer. The transfer begins with the SCSI chip 22 providing data to the FIFO 42. When the FIFO 42 reaches half full, the BMIC 20 is allowed to read the data. The BMIC 20 rapidly transfers the data until the almost empty level is reached, where operations pause until half full or flushing. Eventually the SCSI chip 22 completes its portion of the transfer and notifies the local microprocessor 24 by way of an interrupt. The local microprocessor 24 sets the flush mode and the BMIC 20 can complete transfer of the data. When complete the BMIC 20 notifies the local microprocessor 24 and a new operation can commence. Again the local microprocessor 24 then notifies the host system that the transfer is complete.

Thus the local microprocessor 24 only performs set up control operations and flush enablement and does not handle any data in the transfer, allowing the data to be transferred at the rate of the slower of the BMIC 20 or the SCSI chip 22. If these devices are designed to operate at their bus maximums, the transfer can be performed at a rate near the theoretical maximums.

Figure 3A:
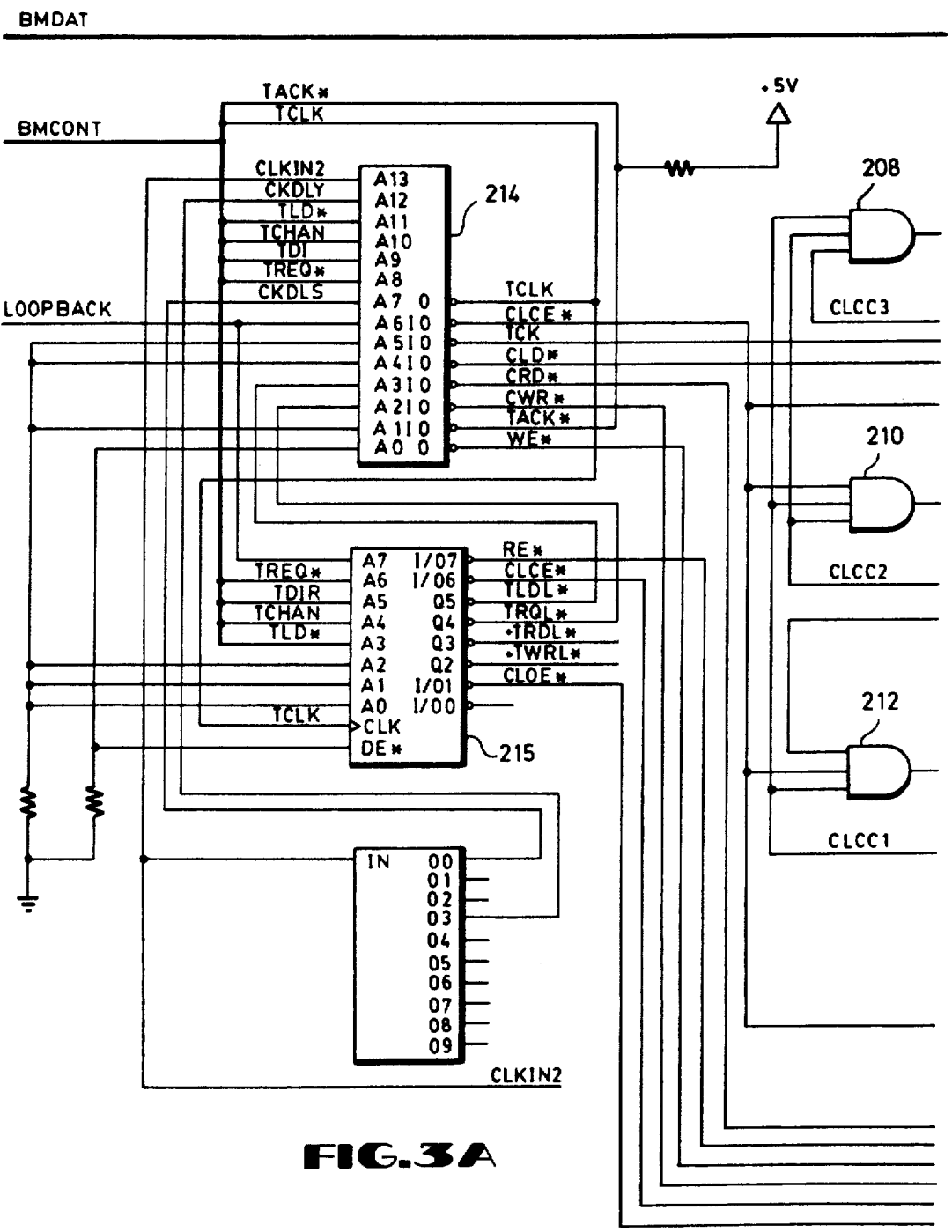
FIGS. 3A, 3B, and 3C are schematic diagrams of portions of the logic used in conjunction with the dual port RAM of FIG. 1.
Figure 3B:
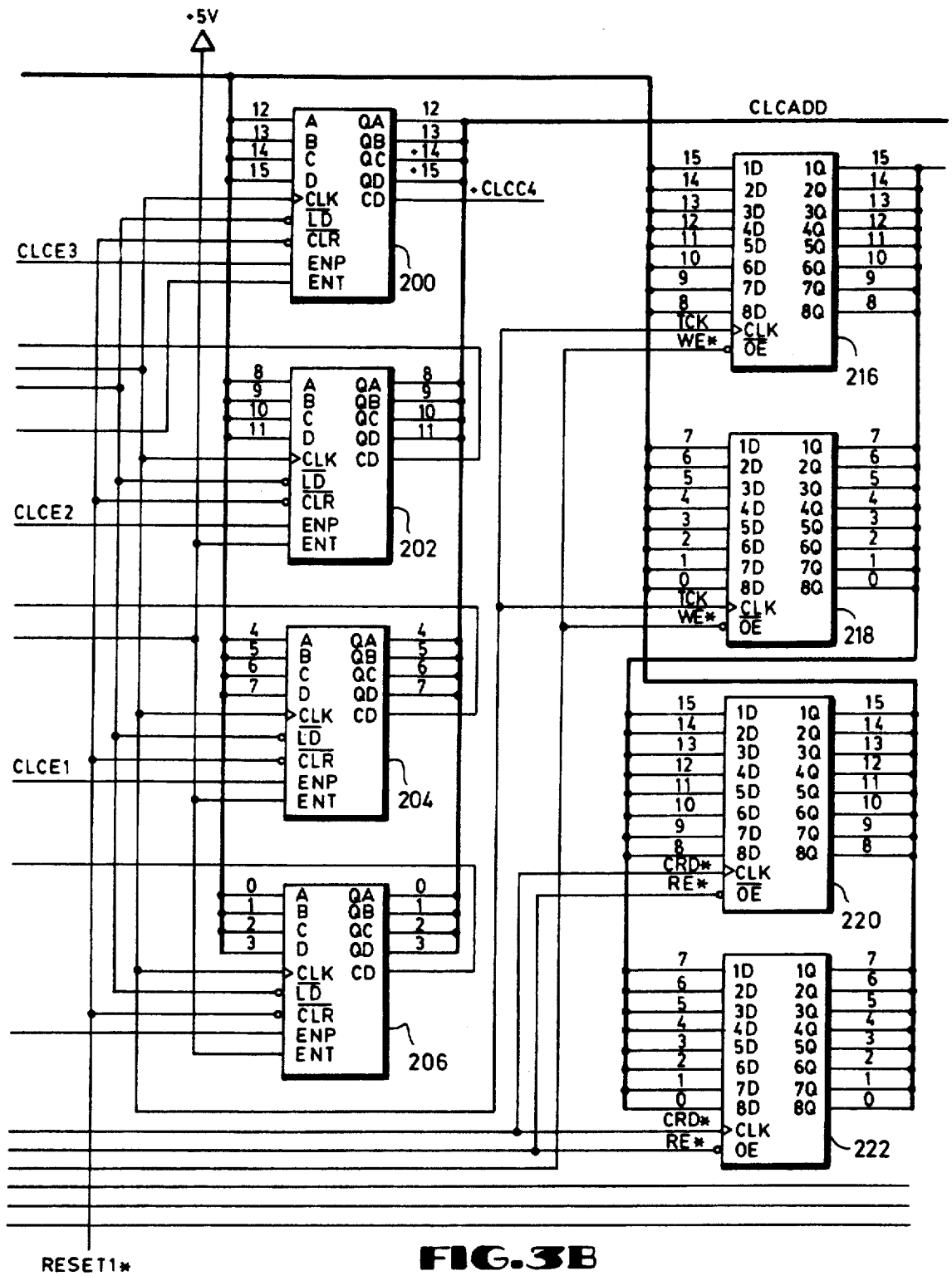
Figure 3C:
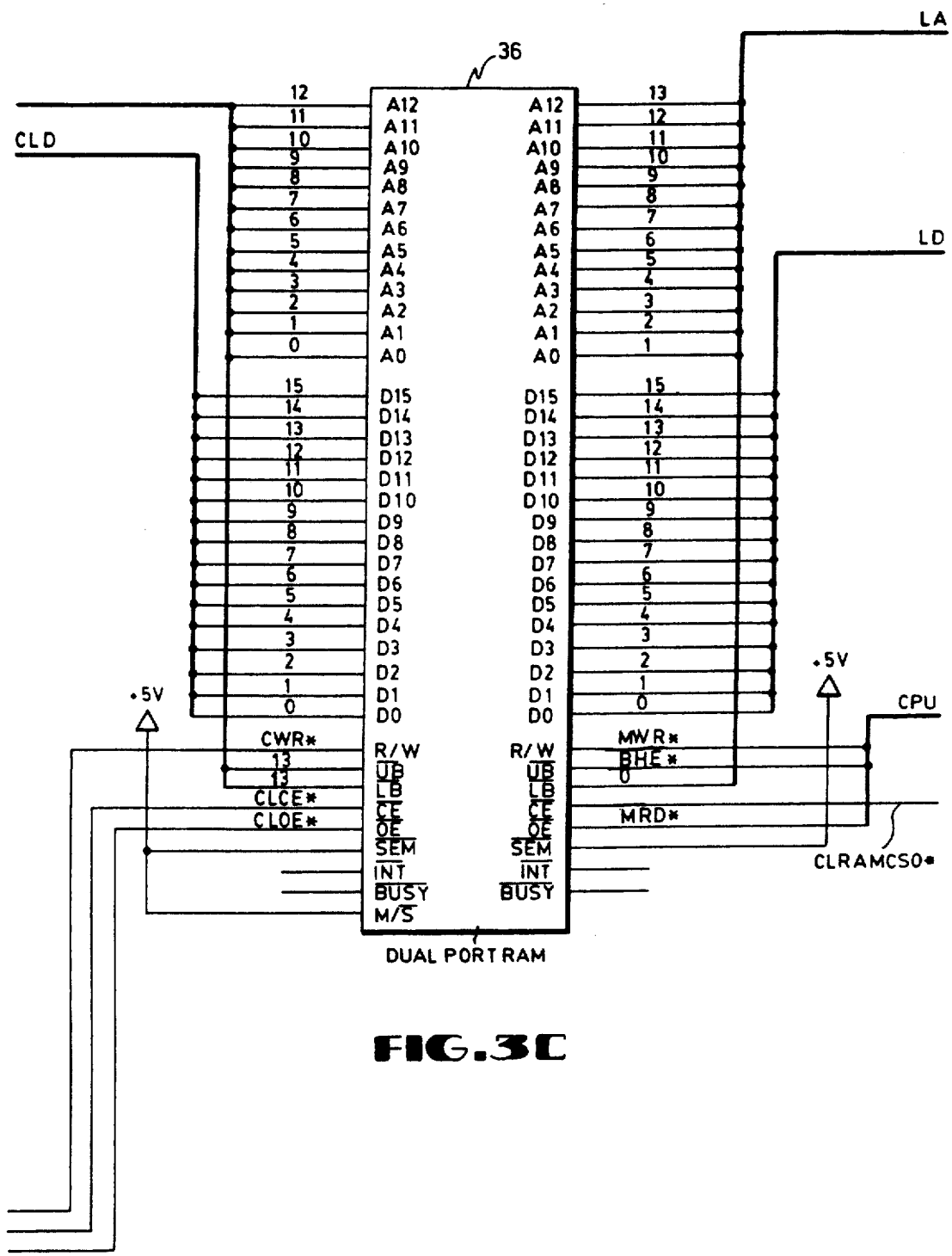

Referring now to FIGS. 3A, 3B and 3C, the memory interface between the dual port RAM 36 and the local processor 24 is relatively straightforward. The address lines from the local processor 24, the LA bus, are provided to the address inputs of one side of the dual ported RAM 36, while the 16 bits of the local microprocessor data bus referred to as LD are provided to the data inputs of the port of the RAM 36. The various control lines from the local processor 24 such as MWR*, BHE* and MRD* for writes/reads and high bytes are provided to the various control inputs of the port. Additionally, a signal referred to as CLRAMCS0* or command channel RAM chip select, which is developed by address decode from the local microprocessor 24 and is not shown for clarity, is provided to the chip enable input of that port of the RAM 36.

The interface to the BMIC 20 is slightly more complicated because an address counter must be developed to allow proper addressing of the RAM 36 and latches must be utilized to allow data synchronization. Four 4 bit synchronous counters 200, 202, 204 and 206 and three 3 input AND gates 208, 210 and 212 are combined to form a synchronous 16 bit counter. The data load inputs of the counters 200, 202, 204 and 206 receive values from the BMDAT or data bus from the BMIC chip 20 and the counter or Q outputs of the counters 200, 202, 204 and 206 are provided to the address inputs of the second port of the RAM 36. The clocking signal of the counters 200, 202, 204 and 206 is provided by the TCK signal, which is an output of a channel control PAL 214. Similarly, the inverted load input of the counters 200, 202, 204 and 206 receives the CLD* output of the channel control PAL 214. The inverted clear inputs of the counters 200-206 receive the RESET1* signal. One enable input of the counters 200-206 is connected to a logic high level, while the second enable inputs of the counters 200-204 are connected to the outputs of the AND gates 208-212. The second enable input of the counter 206, the least significant counter, is connected to the CLCE0 output of the PAL 214.

A pair of 8 bit D-type flip-flops 216 and 218 act as storage registers for transfers of data from the BMIC 20 to the RAM 36. The D inputs of the flip-flops 216 and 218 are connected to the BMDAT bus, while the outputs are connected to the CLD or dual port RAM data bus for the BMIC port of the RAM 36. The TCK signal is provided to the clock inputs of the flip-flops 216 and 218, while a signal referred to as WE*, which is provided by the PAL 214, is provided to the output enable inputs of the flip-flops 216 and 218.

A pair of 8 bit flip-flops 220 and 222 are provided for data transfers from the RAM 36 to the BMIC 20. To this end the data inputs to the flip-flops 220 and 222 are connected to the CLD bus, while the outputs are connected to the BMDAT bus. The clocking signal for the flip-flops 220 and 222 is provided by the CRD* signal, which is provided as an output of the channel control PAL 214. The inverted output enable inputs of the flip-flops 220 and 222 receives the RE* signal, which is provided as an output of a RAM control PAL 215. The read/write input for the BMIC port in the dual port RAM 36 is provided by a CWR* signal provided by the PAL 214. The port or chip enable input is provided by a CLCE* signal, which is provided by the PAL 216, while the output enable input receives the CLOE* signal provided by the PAL 215. An additional signal provided by the PAL 214 is the TCLK signal, which is used as a transfer clock signal by the BMIC 20, the FIFO 42 and the FIFO control logic 52.

The channel control PAL 214 receives as inputs the CLKIN2 signal, which is a preferably a 20 MHz square wave signal produced by a free running oscillator on the SCSI bus controller S. Additional inputs to the PAL 214 are the CKDLY signal, which is a version of the CLKIN2 signal delayed 200 nanoseconds; the TLD* signal received from the BMIC 20; the TCHAN signal; the TDIR signal; the TREQ* signal; the CKDL5 signal, which is a 50 nanosecond delay of the CLKIN2 signal; the LOOPBACK signal and two signals referred to as TLDL* and TRQL* produced by the PAL 215.

The equations for the channel control PAL 214 are as follows:

```
TCLK*  = CLKIN2 + CKDL5
CLCEO* = TRQL* · TACK* + TRQL* · TDR
       + TACK* · TDIR* + LOOPBACK

TCK*   = CKLIN2 + CKDL5
CLD    = TLDL* · TCHAN* · TLD · LOOPBACK* · TACK*
```

-continued

```
CRD  = TDIR* · TCHAN* · TREQ · CKDL5 ·
       LOOPBACK*
     + TLDL · CLDL5 · TACK · TDIR* · TCHAN* ·
       LOOPBACK*

CWR  = TDIR · TCHAN* · TRQL · CKDL5 · LOOPBACK*
     + TDIR · TCHAN* · TRQL · CKDLY* ·
       LOOPBACK*

TACK = TLDL · TCHAN* · LOOPBACK*
     + TCHAN* · LOOPBACK* · TREQ
     + TACK · TLD · TCHAN* · LOOPBACK*

WE   = TDIR · LOOPBACK* · TCHAN* · TRQL
     + TDIR · LOOPBACK* · TCHAN* · TREQ
```

The RAM control PAL 215 is preferably a PAL containing 4 internal D-type flip-flops and the TCLK signal is used to clock these flip-flops. The inputs of the RAM control PAL 215 are the LOOPBACK signal, TREQ* signal, TDIR signal, the TCHAN signal, and the TLD* signal. Several signals are used internally by the RAM control PAL 215 and these are the TDL* signal, TWRL* signal and the FLCNTE signal. Other signals provided by the RAM control PAL 215 have been previously mentioned. The equations for the RAM control PAL 215 are as follows:

```
CLOE = TDIR* · TCHAN* · LOOPBACK*
TRDL := TDIR* · TCHAN* · TREQ · LOOPBACK*
TWRL := TDIR · TCHAN* · TREQ · LOOPBACK*
TRQL := TCHAN* · TREQ · LOOPBACK*
TLDL := TCHAN* · TLD · LOOPBACK* · TLDL*

CLCE = TCHAN* · TREQ · LOOPBACK* + TRQL
     + TCHAN* · TLD · LOOPBACK* + TLDL
RE   = TDIR* · TCHAN* · LOOPBACK* · TLD*
```

The TCLK and TCK signals are similar and provided for fanout reasons. The operation of the dual port RAM channel is disabled during loopback operations as indicated by the presence of the LOOPBACK* term. The TRQL signal is a latched version of a valid data transfer request by the BMIC 20. The TLDL is a toggled, latched version of the TLD signal for channel 0. The TRDL and TWRL signals are latched versions of the read and write strobes produced by the BMIC 20 for channel 0. The CLOE signal is active during channel 0 reads, while the CLCE signal is active during any channel 0 request or address load. The RE signal is active during data reads, while the WE signal is active during all write operations. The TACK signal is active when appropriate. The CLD signal is active when a channel 0 address is present. The CRD signal is active during reads, while the CWR is active during writes.

Therefore, this interface allows the BMIC 20 to read and write the dual port RAM 36 to allow command information to be passed to the local microprocessor 24 and status information to be received from the local microprocessor 24.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A device controller for insertion in a host computer system having data lines and for communicating with a plurality of devices having data lines, the device controller comprising:

a local microprocessor having data lines for controlling operations of the device controller;

command exchange means coupled to said microprocessor, including said microprocessor data lines, and the host computer system, including the host computer system data lines, for exchanging command status information between the host system and said local microprocessor;

means coupled to the plurality of devices and said local microprocessor, including said local microprocessor data lines, for providing a control interface between the plurality of devices and said local microprocessor;

first in, first out memory means for temporarily storing data being transferred between the host computer system and the plurality of devices;

host data transfer means coupled to said first in, first out memory means and the host computer system data lines for reading and writing data between said first in, first out memory means and the host system without said local microprocessor reading or writing said data being transferred; and device data transfer means coupled to said first in, first out memory means and the plurality of devices data lines for reading and writing data between said first in, first out memory means and the plurality of devices without said local microprocessor reading or writing said data being transferred.

2. The device controller of claim 1, further comprising:

means coupled to said local microprocessor, said host data transfer means and said device data transfer means for preparing both said data transfer means for data transfer in a desired direction.

3. The device controller of claim 2, wherein said data transfer preparation means includes means for providing for transfer of all of said data from said first in, first out memory means.

4. The device controller of claim 3, wherein each of said data transfer means includes means for pausing transfer from said first in, first out memory means when said first in, first out means contains less than a predetermined amount of data.

5. The device controller of claim 4, wherein each of said data transfer means include means for allowing said data transfer means to transfer data from said first in, first out memory means when the final data to be transferred is contained in said first in, first out memory means.

6. The device controller of claim 3, wherein each of said data transfer means include means for pausing transfer to said first in, first out memory means when said first in, first out memory means contains more than a predetermined amount of data.

7. The device controller of claim 6, wherein each of said data transfer means includes means for pausing transfer from said first in, first out memory means when said first in, first out means contains less than a predetermined amount of data.

8. The device controller of claim 7, wherein each of said data transfer means include means for allowing said data transfer means to transfer data from said first in, first out means when the final data to be transferred is contained in said first in, first out means.

9. The device controller of claim 1, wherein said command exchange means includes a dual ported random access memory for receiving command and status information, said dual ported random access memory being coupled to said local microprocessor and said local microprocessor data lines and the host computer system and the host computer system data lines.

* * * * *

UNITED STATES PATENT AND TRADEMARK OFFICE
CERTIFICATE OF CORRECTION

PATENT NO. : 5,241,630

DATED : August 31, 1993

INVENTOR(S) : Thomas W. Lattin, Jr., et al.

It is certified that error appears in the above-identified patent and that said Letters Patent is hereby corrected as shown below:

In column 13, line 16, please replace "command status" with --command and status--.

Signed and Sealed this

Fifth Day of April, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,241,630
DATED : August 31, 1993
INVENTOR(S) : Thomas W. Lattin, Jr. et al.

It is certified that error appears in the above-identified patent and that said Letters Patent is hereby corrected as shown below:

Column 13,
Line 16, delete "command status" and insert -- command and status --.

Signed and Sealed this

Tenth Day of January, 2006

JON W. DUDAS
*Director of the United States Patent and Trademark Office*